United States Patent [19]

Charng

[11] Patent Number: 5,050,263

[45] Date of Patent: Sep. 24, 1991

[54] WIPER BLADE ASSEMBLY

[75] Inventor: Cedric S. K. Charng, Taipei, Taiwan

[73] Assignee: China Wiper Special Rubber Co. Ltd., Taipei, Taiwan

[21] Appl. No.: 557,310

[22] Filed: Jul. 23, 1990

[51] Int. Cl.5 .............................................. B60S 1/40
[52] U.S. Cl. .............................. 15/250.32; 15/250.42
[58] Field of Search ........... 15/250.31, 250.32, 250.33, 15/250.35, 250.42; 403/317, 321, 322, 324

[56] References Cited

U.S. PATENT DOCUMENTS

| 3,866,260 | 2/1975 | Cone | 15/250.32 |
| 4,118,825 | 10/1978 | Hoebrechts et al. | 15/250.32 |
| 4,209,874 | 7/1980 | Hancu | 15/250.32 |
| 4,324,019 | 4/1982 | Mohnach et al. | 15/250.32 |
| 4,503,580 | 3/1985 | Sharp | 15/250.32 |
| 4,649,591 | 3/1987 | Guerard | 15/250.32 |

FOREIGN PATENT DOCUMENTS

| 0232598 | 8/1987 | European Pat. Off. | |
| 0327233 | 8/1989 | European Pat. Off. | |
| 1069875 | 2/1954 | France | 15/250.32 |
| 0064564 | 4/1986 | Japan | 15/250.32 |
| 2038169 | 7/1980 | United Kingdom | |

Primary Examiner—Harvey C. Hornsby
Assistant Examiner—Gary K. Graham
Attorney, Agent, or Firm—Howson & Howson

[57] ABSTRACT

A wiper blade assembly comprising a primary yoke having a central portion with a transverse socket therein for receiving a pivot pin of a wiper arm of the side mounting type. A plastics latching member is located within a recess open to the underside of the central portion and in communication with the pivot pin receiving socket. The latching member has a resiliently deflectable abutment member which is movable into or out of a latching position in which it is received within an annular recess formed in the pivot pin. Sideways extending projecting portions of the latching member are provided to facilitate movement of the abutment member.

10 Claims, 1 Drawing Sheet

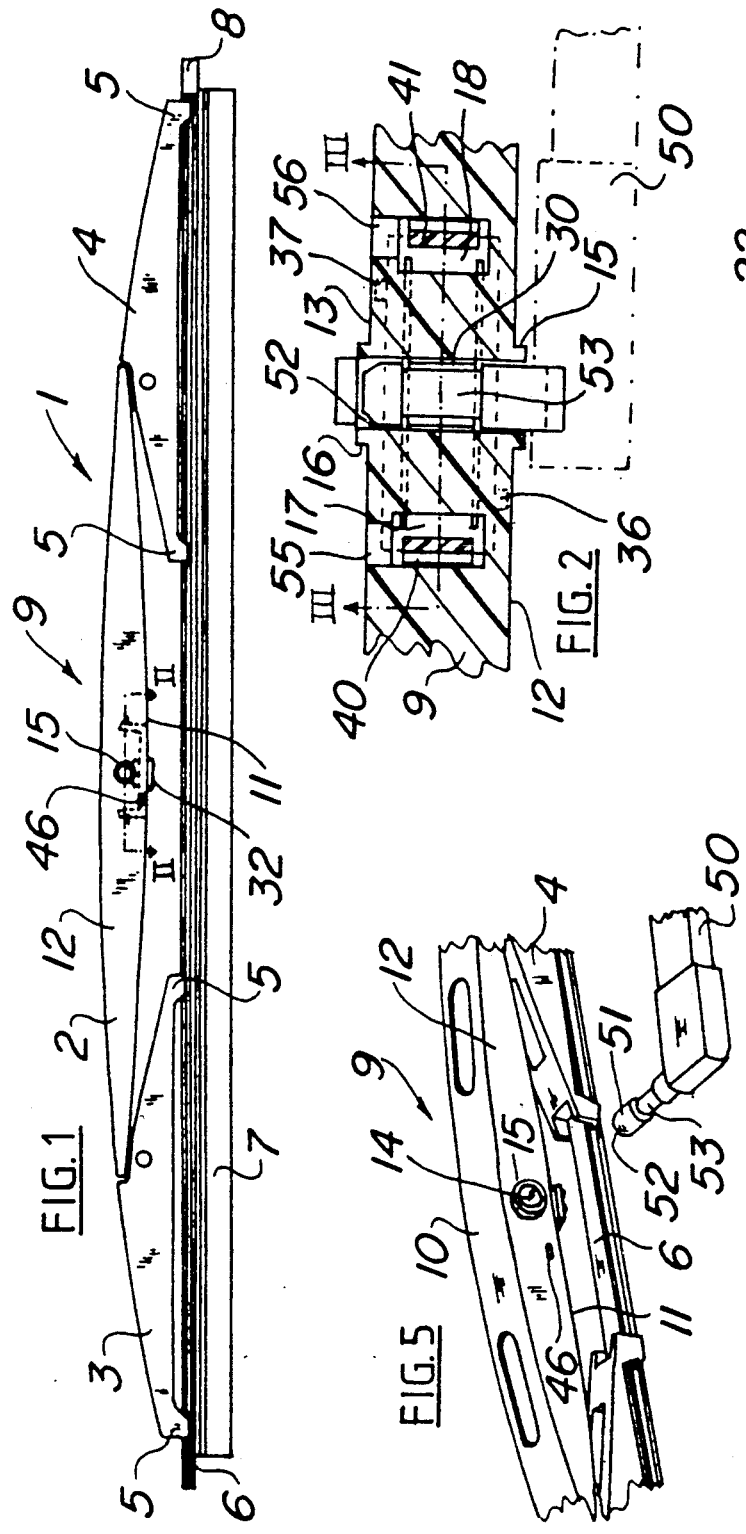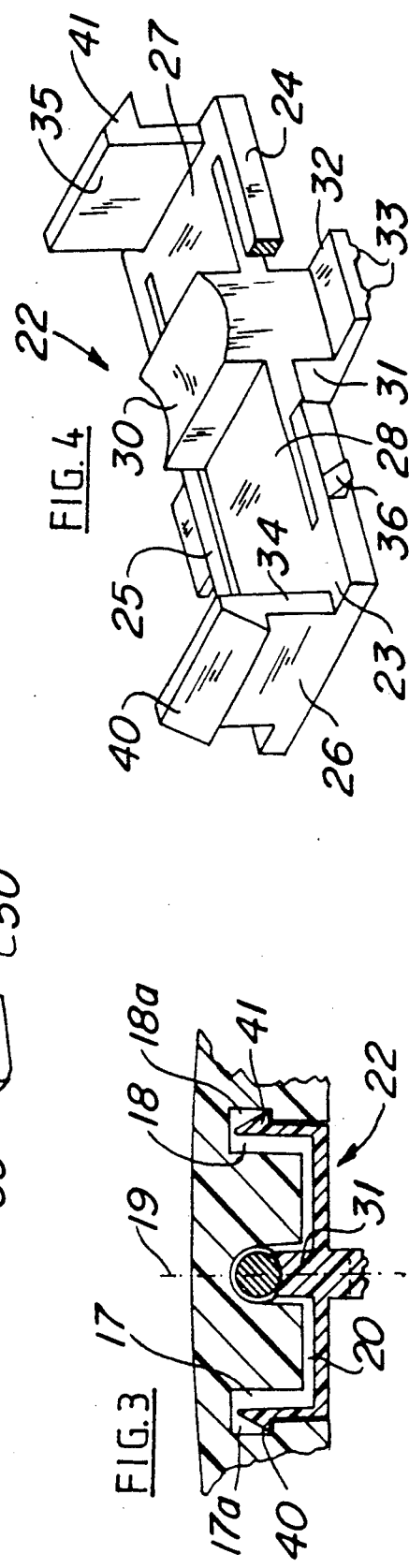

WIPER BLADE ASSEMBLY

BACKGROUND OF THE INVENTION

This invention relates to a wiper blade assembly and more particularly to a wiper blade pressure distributing yoke provide with means to enable it to be coupled to a wiper arm having a pivot pin of the side mounting type. Primarily the invention is concerned with wiper blade assemblies for vehicle windshields or windscreens but it may also find application for use with vehicle headlamps.

Wiper arms of the side mounting type have a transversely extending pivot pin protruding from one side. In use the pivot pin is inserted into a transverse socket formed in a main yoke of a wiper blade assembly and conventionally is detachably held in position within the socket by some form of latching device cooperating with an annular recess formed in, and spaced from a free end of, the pivot pin.

One known type of wiper blade assembly is disclosed in U.S. Pat. No. 4,503,580. In this known specification, the wiper blade assembly includes a primary yoke having a rigid central portion in which is formed a pivot pin receiving socket extending from one to the other side of the central portion. A plastics latching member is mounted within a recess which is formed in the underside of the central portion and which opens into the pivot pin receiving socket. The recess extends either side of the socket from a pocket on one side to a passageway on the other side which opens to the topside of the central portion. The latching member has an anchor portion detachably received in the pocket for securely detachably retaining the latching member in the recess and a latch portion resiliently connected to the anchor portion and normally received within an annular recess of a wiper arm pivot pin to retain the latter in the pivot pin receiving socket. In order to detach the pivot pin, a finger depressible member rigidly joined to the latch portion and positioned in, so as to extend to the top of, said passageway is depressed to resiliently move the latch portion relative to the anchor portion and clear of the annular recess thereby allowing the pivot pin to be removed from the socket.

SUMMARY OF THE INVENTION

An object of the present invention is to provide a wiper blade assembly having a neew means for detachably connecting thereof a wiper arm of the side mounting type.

Another object of the present invention is to provide a simple means for enabling a wiper arm of the side mounting type to be securely connected to, whilst being easily detachable from, a wiper blade assembly.

According to the present invention there is provided a wiper blade assembly comprising a main yoke having a central portion provided with spaced apart opposite side walls, an underside and first engaging means, transverse socket means formed in said central portion and opening into each of said opposite side walls for receiving a sidewise extending wiper arm pivot pin having an annular recess spaced from a free end thereof, means defining a lengthwise extending recess which is formed in, and is open to the underside of, said central portion, and an integrally molded latching member made of plastics material comprising a first body part having spaced apart opposite side regions and spaced apart opposite end regions, a second body part having opposite ends integrally joined to respective ones of said opposite end regions and being resiliently displaceable relative to the first body part from a latching position, second engaging means on said first body part interengageable with said first engaging means for securing the latching member within said lengthwise extending recess, latch means on the second body part which, when the second body part is in its latching position, are located in the annular recess of a wiper arm pivot pin received within said socket means for retaining the wiper arm pivot pin therein and, between said opposite ends of said second body part, actuating means movably engageable to facilitate resilient displacement of said second body part relative to said first body part out of its latching position for moving the latch means clear of the annular recess thereby enabling removal of the wiper arm pivot pin from the socket means.

Conveniently said second body part, when in a normal undeflected condition, is located between the said spaced apart opposite side regions in a common plane therewith. Suitably said actuating means have sideways projecting portions positioned beneath the said underside of the central portion and projecting outwardly of the opposite side walls of said central portion.

Preferably the latch means comprises abutment means on the upper side of said second body part.

Preferably said second engaging means comprise first catch means on each of said opposite end regions for interengagement with corresponding second catch means of said first engaging means. Preferably also the second engaging means comprise third catch means on each of said opposite spaced apart side regions for interengagement with corresponding fourth catch means of said first engaging means.

Preferably means are provided to facilitate disengagement of the first and second engaging means when the latter are interengaged so that the latching member is detachably securable within the recess.

BRIEF DESCRIPTION OF THE DRAWINGS

The foregoing and other objects, features and advantages of the invention will be further apparent from the following detailed description and accompanying schematic drawing of an illustrative embodiment of the invention in which:

FIG. 1 is a side elevation of a wiper blade assembly according to the invention for attachment to a wiper arm of the side mounting type;

FIG. 2 is an enlarged sectional view taken on the line II—II of FIG. 1;

FIG. 3 is a sectional view taken on the line III—III of FIG. 2;

FIG. 4 is an enlarged, partly cut away perspective view of a latching member of the wiper blade assembly shown in FIGS. 1-3; and FIG. 5 is partial perspective view of a central portion of a main yoke of the wiper blade assembly shown in FIGS. 1-4 and an end of a wiper arm connectible thereto.

DESCRIPTION OF THE PREFERRED EMBODIMENT

FIG. 1 shows a wiper blade assembly 1 according to the invention comprising a plastics main yoke 2 having plastics secondary yokes 3 and 4 pivotally connected to opposite ends thereof in a known manner. The secondary yokes 3 and 4 have claws 5 engaged in elongate grooves along the opposite sides of a plastics carrier strip 6 carrying a wiper blade 7 (not shown in FIG. 5). A metal end clip 8 of known design is detachably connected to the strip 6 and engages the outer claw 5 of the secondary yoke 4 to prevent strip 6 from becoming slidingly detached from the retaining claws.

The main yoke 2 has a central portion 9 having a topside 10, an underside 11 and spaced apart side walls 12 and 13. A pivot pin receiving socket means 14 extends from one to the other of said side walls 12 and 13 and is defined at the side walls by annular side wall projections 15 and 16, respectively. These projections 15 and 16 are intended to be received in the holes (not shown) of a straddle-type adaptor (not shown) detachably connectible to the central portion for connecting the wiper assembly 1 to an end of a wiper arm (not shown) other than of the side mounting type.

Opening into the underside 11 of the central portion 9 are spaced apart pockets 17 and 18 positioned on either side of a transverse plane 19 (see FIG. 3) passing through the axis of the socket means 14 and a generally rectangular recess 20 communicating, at its opposite ends, with the pockets 17 and 18 and, between its ends, with the socket means 14.

A molded plastics latching member 22 (see FIGS. 2-4) is located within the recess 20 and comprises an outer first body part 23 having spaced apart side regions 24 and 25 and spaced apart end regions 26 and 27, an inner second body part 28 which is arranged between the spaced apart side regions 24 and 25 in a common plane with the first body part 23 and which has its opposite ends integrally joined to the end regions 26 and 27, respectively, an abutment member 30 having a curved, part cylindrical upper surface and projecting upwardly from a central region of the body part 28 and an inverted T-section portion having a stem part 31 integrally joined to, and extending downwardly from, the second body part 28 and a cross-piece 32 integrally joined to the lower end of the stem part 31. The cross-piece 32 has strengthening ribs 33 extending between its opposite ends for providing it with a greater degree of rigidity. The latching member 22 further includes first and second catches 34 and 35 which are integrally joined to, and extend upwardly from, the end regions 26 and 27, respectively, and third and fourth catches 36 and 37 (see FIG. 2) integrally joined to, and extending sideways from, opposite ends of the side regions 24 and 25, respectively. The upper ends of the catches 34 and 35 have enlarged heads 40 and 41, respectively, each with an angled surface which slopes downwardly and outwardly. As shown in FIG. 4, the head 41 projects outwardly further than the head 40 although this is not essential (or necessarily preferred) and the heads 40 and 41 may be of equal size as shown in FIG. 3. The upper surfaces of the catches 36 and 37 also have angled surfaces which slope downwardly and outwardly.

The latching member 22 is assembled with the primary yoke 2 by locating the upper ends of the catches 34 and 35 in the mouths of the pockets 17 and 18, respectively, and pushing the member 22 upwardly into the recess 20. As the latching member moves upwardly into the recess 20, the enlarged heads 40 and 41 slide against end walls of the pockets 17 and 18 causing the catches 34 and 35 to deflect resiliently inwards. At the end of this upwards travel the catches 34 and 35 spring back under their own resilience so that the enlarged heads 40 and 41 engage in enlarged portions 17a and 18a of the pockets 17 and 18, respectively. In a similar manner, the catches 36 and 37 slide against the side walls of the recess 20 causing the side regions 24 and 25 to deflect resiliently inwards as the latching member 22 moves upwardly. At the end of the upwards travel, the side regions 24 and 25 spring back under their own resilience as the catches 36 and 37 enter, and are located in, openings 46 (only one of which can be seen in FIGS. 1 and 5) in the side walls 12 and 13. The latching member 22 is thus securely located within the recess 20 by interengagement of the catches 34–37 with cooperating engaging means of the central portion 9. In this secured position, the abutment member 30 projects up into, so as to partly obscure or block, the socket means 14.

FIGS. 2 and 5 show a wiper arm 50 of the side mounting type respectively disconnected from, and connected to, the wiper blade assembly 1. The wiper arm 50 has a pivot pin 51 with a bevelled or rounded free end 52 and an annular groove or recess 53 spaced therefrom. In order to connect the wiper arm 50 to the wiper blade assembly 1, the free end 52 of the pivot pin 51 is inserted through the annular projection 15 at one end of the socket means 14 and is pushed towards the other annular projection 16. As the pivot pin passes through the socket means 14, its bevelled or rounded free end 52 engages the abutment member 30 and resiliently deflects it downwardly. When the pivot pin 51 is fully inserted, the second body part 28 returns, under its own resilience, from its deflected condition towards its normal undeflected condition so that the abutment member 30 is moved into a latching position within the annular recess 53 (see FIG. 3). The curved, part cylindrical upper surface of the abutment member 30 is positioned at the bottom of the annular recess 53 and preferably contacts the cylindrical bottom surface of the annular recess. If such contact occurs, it will be realized that, in the latching position of the abutment member 30, the second body part 28 may be in a slightly resiliently deflected condition (i.e. not in its normal, undeflected condition). The abutment member 30 positioned within the annular recess 53 thus prevents axial withdrawal of the pivot pin 51 from the socket means 14.

To withdraw the pivot pin from the socket means 14 it is necessary to move the abutment member 30 resiliently downwardly out of its latching position so that it is moved clear of the annular recess 53. This downward movement of the abutment member 30 is achieved by gripping between finger and thumb, and pulling or pressing downwardly, the opposite ends of the cross-piece 32 which project sideways beneath the bottoms of the opposite side walls 12 and 13. On withdrawal of the pivot pin 51 from the socket means 14, the cross-piece 32 can be released so that the body part 28 returns under its natural resilience back to its normal position.

The latch member 22 is suitably molded from a tough thermoplastic composition, such as acetal resin. Although not shown, the regions where the opposite ends of the second body part 28 are joined to the end regions 26 and 27 may be made thinner or the ends of the second body part made narrower to facilitate resilient flexing of the second body part 28 relative to the first body part. On deflection of the second body part 28, the first body part 23 is retained in a generally fixed position by the interengagement of the catches 34 and 35 in the pockets 17 and 18 and of the catches 36 and 37 in the openings 46.

Normally there is no need to remove the latching member 22 from its secured position. However the latching member 22 can be detached by pressing the catches 36 and 37 inwards through the openings 46 to release their interengagement therewith and by similarly deflecting the heads 40 and 41 inwardly out of interengagement with the enlarged portions 17a and 18a, respectively. Inward resilient deflection of the heads 40 and 41 is possible by inserting a tool or the like through molding openings 55 and 56 (see FIG. 2) formed in the side wall 13 and communicating with the enlarged portions 17a and 17b of the pockets 17 and 18, respectively. Detachment of the latching member 22 may be desirable if a different wiper arm with a different pivot pin form (e.g. having a differently dimensioned annular recess) is to be connected to the wiper blade assembly.

This invention can be embodied in other forms without departing from the spirit or essential attributes thereof and, accordingly, reference should be made to the appended claims as indicating the scope thereof.

I claim:

1. A wiper blade assembly comprising a main yoke having a central portion provided with spaced apart opposite side walls, an underside, transverse socket means formed in said central portion and opening into each of said opposite side walls for receiving a sidewise extending wiper arm pivot pin having an annular recess spaced from a free end thereof, means defining a lengthwise extending recess which is formed in, and is open to the underside of, said central portion, first engaging means carried by said yoke, and an integrally molded latching member made of plastics material comprising a first body part having spaced apart opposite side regions and spaced apart opposite end regions, a second body part having opposite ends integrally joined to respective ones of said opposite end regions and being resiliently displaceable relative to the first body part from a latching position, second engaging means on said first body part interengageable with said first engaging means for securing the latching member within said lengthwise extending recess, latch means on the second body part which, when the second body part is in its latching position, are located in the annular recess of said wiper arm pivot pin received within said socket means for retaining the wiper arm pivot pin therein and, between said opposite ends of said second body part, actuating means movably engageable to facilitate resilient displacement of said second body part relative to said first body part out of its latching position for moving the latch means clear of the annular recess thereby enabling removal of the wiper arm pivot pin from the socket means.

2. A wiper blade assembly according to claim 1, in which said second body part, when in a normal undeflected condition position, is located between the said spaced apart opposite side regions in a common plane therewith.

3. A wiper blade according to claim 1, in which said actuating means have sideways projecting portions positioned beneath the said underside of the central portion and projecting outwardly of the opposite side walls of said central portion.

4. A wiper blade assembly according to claim 3, in which the sideways projecting means include reinforcing rib means.

5. A wiper blade assembly according to claim 1, in which the latch means comprises abutment means on the upper side of said second body part.

6. A wiper blade assembly according to claim 1, in which said second engaging means comprise first catch means on each of said opposite end regions for interengagement with corresponding second catch means of said first engaging means.

7. A wiper blade assembly according to claim 6, in which said first catch means project upwardly and have enlarged head means and said second catch means comprise pocket means at opposite ends of said lengthwise extending recess in which the enlarged head means are engaged.

8. A wiper blade assembly according to claim 7, in which holes in said side walls of said central portion communicate with said pocket means and enable tool means to be inserted therein to disengage said head means from said pocket means.

9. A wiper blade assembly according to claim 6, in which the second engaging means further comprise third catch means on each of said opposite spaced apart side regions for interengagement with corresponding fourth catch means of said first engaging means.

10. A wiper blade assembly according to claim 9, in which said fourth catch means comprise openings formed in said opposite side walls of the central portion.

* * * * *